United States Patent [19]

Lilley

[11] Patent Number: 4,697,207

[45] Date of Patent: Sep. 29, 1987

[54] SYSTEM FOR GENERATING A SYNCHRONIZING SIGNAL IN RESPONSE TO TWO TIMING REFERENCE SIGNALS

[75] Inventor: Martin A. Lilley, Fremont, Calif.

[73] Assignee: Ampex Corporation, Redwood City, Calif.

[21] Appl. No.: 821,630

[22] Filed: Jan. 23, 1986

Related U.S. Application Data

[63] Continuation-in-part of Ser. No. 781,545, Sep. 30, 1985, abandoned.

[51] Int. Cl.[4] .............................................. H04N 9/44
[52] U.S. Cl. ........................................ 358/17; 358/19
[58] Field of Search ............... 358/13, 17, 19, 149, 358/150

[56] References Cited

U.S. PATENT DOCUMENTS

| | | | |
|---|---|---|---|
| 4,024,571 | 5/1977 | Dischert et al. | 358/19 |
| 4,054,904 | 10/1977 | Saitoh et al. | 358/19 |
| 4,280,138 | 7/1981 | Stock | 358/19 |
| 4,339,770 | 7/1982 | Dennison et al. | 358/19 |

Primary Examiner—John W. Shepperd
Attorney, Agent, or Firm—Elizabeth E. Strnad; Joel D. Talcott

[57] ABSTRACT

A method and system for composite system phase control in a signal processor such as a television video recorder operating in a genlocked system. A synchronizing signal, preferably a frame-rate horizontal reset pulse, is generated in response to coincidence between predetermined parts of two timing reference signals, in particular color television frame-rate horizontal line reference pulses and clock pulses derived from the color subcarrier. Possible coincidence ambiguity between the two timing reference signals exists when transitions in the two signals occur within a predetermined time period. The phase of one of the reference signals, the subcarrier frequency clock, is shifted 180 degrees (one-half cycle) to eliminate the potential coincidence ambiguity. Simultaneously, the phase of the generated synchronizing signal, the horizontal reset pulse, is shifted by one-half cycle of the subcarrier-related clock signal in a direction to compensate for the phase shift of that reference signal so that the phase shift of the generated synchronizing signal is transparent, i.e. there is no apparent change in the position of the generated sychronizing signal.

22 Claims, 9 Drawing Figures

Signal at beginning of each first field

Signal at beginning of each second field

Line synchronizing signals

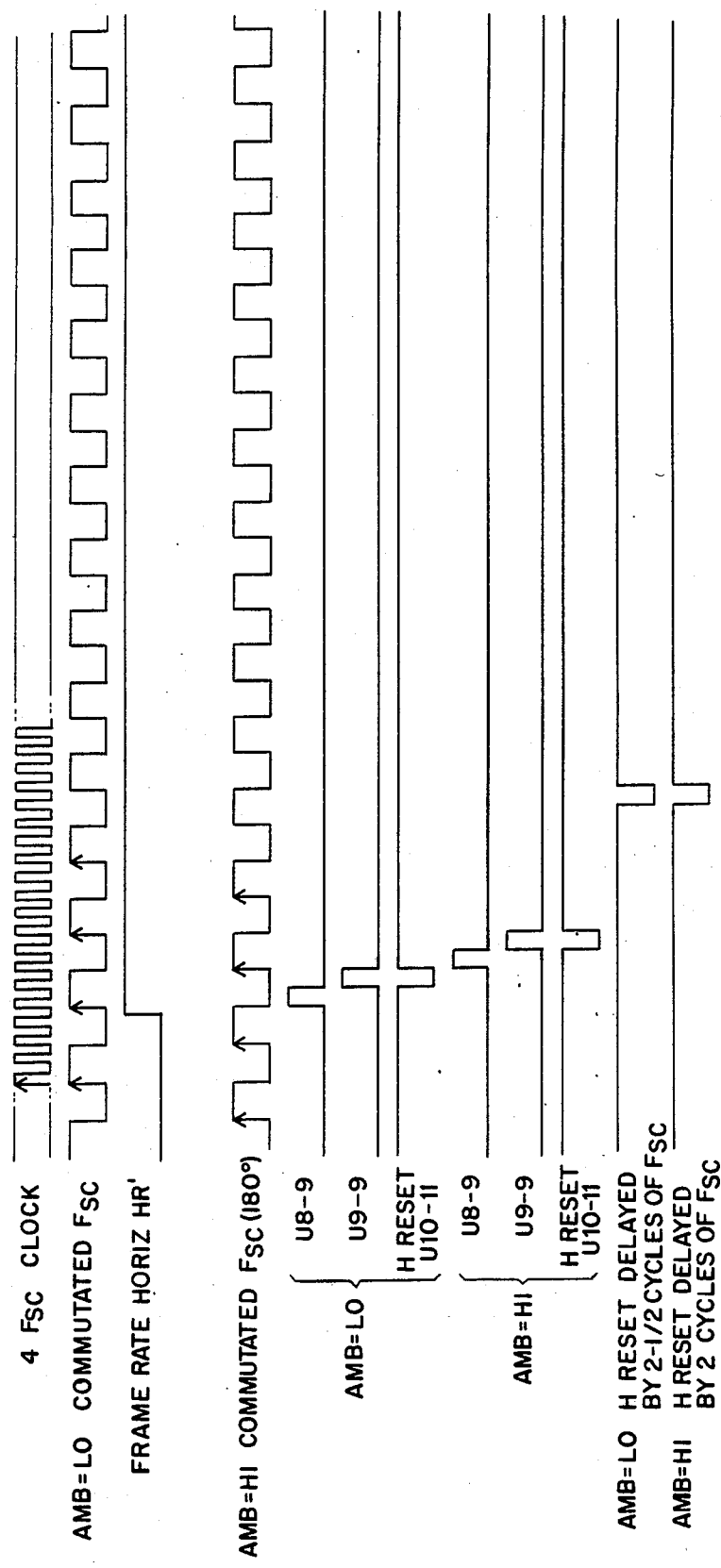

SYSTEM FOR GENERATING A SYNCHRONIZING SIGNAL IN RESPONSE TO TWO TIMING REFERENCE SIGNALS

CROSS-REFERENCE TO RELATED APPLICATIONS

This application is a continuation-in-part of copending application Serial No. 781,545 filed September 30, 1985 now abandoned by Martin Albert Lilley for "Method And System For Composite Phase Control In Video Signal Processors" assigned to the present invention.

BACKGROUND OF THE INVENTION

The present invention relates generally to phase control for signal processors and more particularly to a method and system for color television signal synchronization to provide the appropriate phase relation to a reference.

In signal processors, particularly those found in television video recorders of the type used in television studios, the phasing of the various time reference signals generated by the processor sync generator is extremely important if undesirable sync-related disturbances are to be avoided. The TV signal processor may be "genlocked" to an external reference video signal, thus permitting phase adjustment of locally generated reference signals such as subcarrier and horizontal sync.

As the phasing of one or more reference signals is adjusted, relative phase ambiguities can occur. Such ambiguities can cause unacceptably large disturbances in picture reproduction or complete loss of sync lock.

It is therefore an object of the present invention to provide a novel method and system for detecting a region of potential phase ambiguity between two reference signals in a signal processor, particularly for television signals, and eliminating the ambiguity without unacceptable disturbances or loss of data.

It is another object of the present invention to provide a novel method and system for composite phase control of the reference signals in a video signal processor whereby phase adjustment of one signal does not cause unacceptable disturbances or loss of data due to passage through a region of ambiguous relative phase.

It is a more specific object of the present invention to provide a novel color television processor synchronizing system and method for providing subcarrier phase control through a range exceeding one subcarrier cycle without undesirable phase hops in a locally generated (horizontal) reset signal due to coincidence ambiguity as subcarrier phase is adjusted.

It is yet another object of the present invention to provide a novel color television signal processor synchronizing system and method for providing a composite system phase control such that the phase of the reconstituted subcarrier can be adjusted by a single control through more than one subcarrier cycle without undesirable disturbances.

In accordance with the present invention, a plurality of timing reference signals are produced from a composite data signal such as a television signal. A predetermined condition of time coincidence between two of the reference signals (e.g. the occurrence of a particular edge or transition of one signal, used as a clock, during a particular logic level of another signal) produces a synchronizing signal, preferably a video frame-rate horizontal reset pulse which phases the horizontal-rate pulses in the processor sync generator. An ambiguity detector determines when a condition of potential coincidence ambiguity exists, i.e. when the phase relationship between the two reference signals is such that the point of time coincidence and thus the timing of the generated synchronizing signal may vary irregularly by a significant amount for slight variance in the relative phase relationship of the two reference signals. When such an ambiguity condition is detected, the phase of one of the reference signals is shifted 180 degrees, to eliminate the coincidence ambiguity. In the preferred embodiment that reference signal is a clock signal designated $F_{sc}$ and has a frequency of the color subcarrier signal. Simultaneously, the phase of the generated synchronizing signal is shifted by at least one-half cycle of the $F_{sc}$ clock signal.

Since the ambiguity detector can either advance or retard the timing of the generated synchronizing signal by one-half cycle of the one reference signal, the $F_{sc}$ clock, there are two possible conditions when the the $F_{sc}$ clock is inverted to eliminate the coincidence ambiguity. Firstly, the shift in the generated synchronizing signal resulting from the one-half cycle phase shift in the $F_{sc}$ clock can be compensated by a one-half cycle phase shift of the generated synchronizing signal in the direction which shifts it back to its original position. Secondly, the generated synchronizing signal can be shifted one-half cycle in the opposite direction resulting overall in a one $F_{sc}$ cycle phase shift of the generated synchronizing signal from its original position. While the first one-half cycle transition is transparent, the second is not unless the one $F_{sc}$ cycle shift is compensated.

In accordance with the preferred embodiment of the present invention, the system controller, which controls both system subcarrier phase and horizontal phase, monitors the condition of the ambiguity detector output. Thus, if the second condition exists and the generated synchronizing signal shifts by one cycle of $F_{sc}$, the system controller detects the change in the ambiguity control signal and, by knowing the direction of system subcarrier phase change, either increments or decrements the horizontal phase data to compensate the one cycle phase shift. Because the generated synchronizing signal occurs at a frame rate, there is ample time for the system controller to send the new horizontal phase data between the time that an ambiguity change is detected and the following generated synchronizing signal.

BRIEF DESCRIPTION OF THE DRAWINGS

The foregoing and other objects and advantages are accomplished in accordance with the present invention as will be seen from the following detailed description of a preferred embodiment when read in conjunction with the drawings in which.

DETAILED DESCRIPTION

A preferred embodiment of the present invention is described hereinafter as implemented in a genlocked sync generator for a digital time base corrector in a video recorder, in particular a video recorder of the type used in TV recording studios or by broadcasters. Various circuits applicable to such a video recorder are disclosed in U.S. Pat. No. 4,270,150, assigned to the assignee of the present invention, and in the related patents identified therein. While the invention is disclosed in the environment of a television recording system, it should be understood that it may be applicable to synchronization techniques used in other signal processors.

Figure 1A:
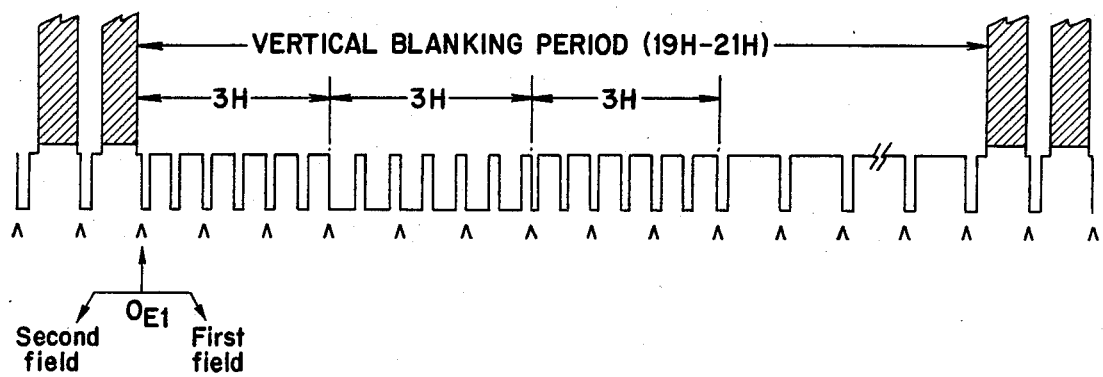
FIG. 1A is a graphic illustration of typical vertical and horizontal (line) synchronizing signals for 525 NTSC television at the beginning of each first field.
Figure 1B:
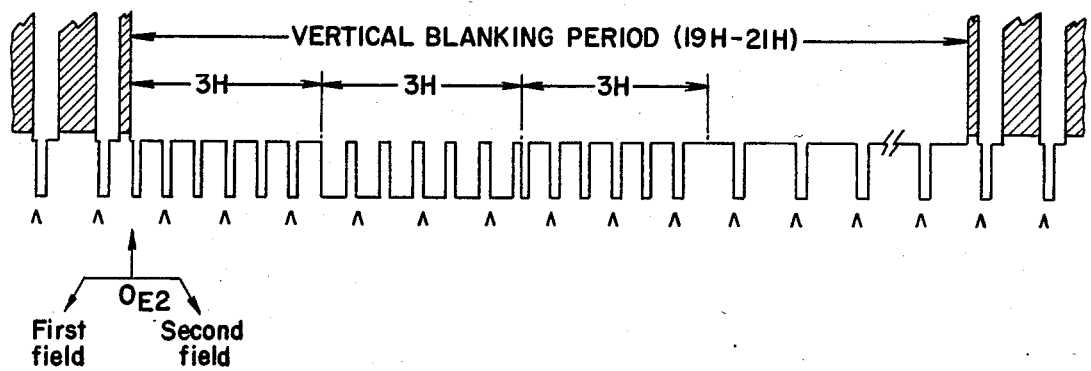
FIG. 1B is a graphic illustration of the signals shown in FIG. 1A at the beginning of each second field.

Referring to FIG. 1 by way of background, the sync interval portions of a typical color television signal in its demodulated or baseband form includes two successive fields (FIGS. 1A and 1B) which are interlaced during the picture scanning process to produce one frame. Each field includes reference signals which provide time/frequency references to guide the television signal processor in faithfully recording, reproducing, or otherwise using the video information.

Since the signals are generally the same in each field (there is a slight difference to provide for interlacing) only one field will be briefly described. FIG. 1A illustrates the vertical blanking interval, during which the scan returns from the bottom of the picture to the top, together with parts of the signal containing line scanning information. The symbol ∧ indicates the unbroken sequence of edges of horizontal or line-sync pulses throughout the field-blanking period. Each period H represents the horizontal scanning interval, the time required to scan one picture line and return (retrace) to the starting point of the next line. During the period H, there is a horizontal blanking interval for blanking during horizontal retrace (FIG. 1C), a horizontal sync pulse to which line scanning is synchronized, and video information to modulate brightness and produce the picture.

Figure 1C:
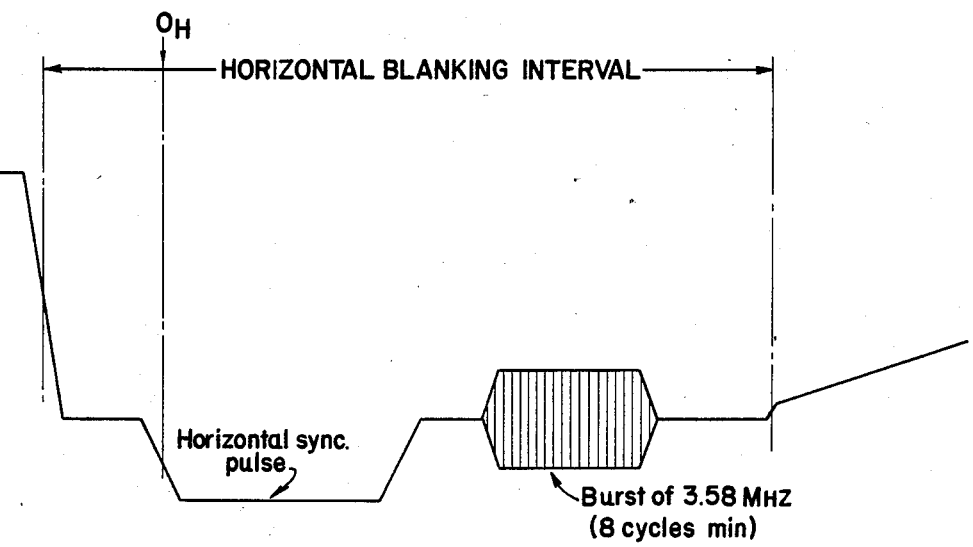
FIG. 1C is a graphic illustration of line synchronizing signals occurring during each horizontal blanking interval.

In color transmissions, a color burst, a minimum of 8 cycles of a chrominance subcarrier at a predetermined frequency (3.58 MHz in the U.S. standard NTSC), is provided during the horizontal blanking interval as a frequency reference for generating a continuous wave subcarrier reference at the receiver (FIG. 1C). The vertical blanking interval not only provides information for blanking during the vertical interval, but also contains horizontal and vertical sync information as well as equalizing pulses used to ensure proper vertical synchronization of successive fields.

A typical processor of color television signals has a sync generator including sync separator and detector circuitry as well as phase-locked oscillator and phase shift circuitry to generate timing reference signals such as the sync and color reference signals. As will be appreciated by one skilled in the art, the time reference signals are used for a variety of purposes in video processing equipment. It also will be appreciated that the time reference signals will vary depending upon the television standard of the incoming signal (e.g. NTSC or PAL), and that it often is desirable to lock the generated timing reference signals to an equipment reference such as a studio reference (i.e. genlock the generated references).

The present invention relates to one aspect of the sync generator or other similar synchronizing circuits and is aimed at solving sync problems that can occur when the phasing of one sync generator to another is attempted. In the color television environment, it should be noted that there is a fixed mathematical relationship between the subcarrier/burst frequency and that of horizontal sync. Therefore, changing the subcarrier phase, or system phase, of the genlocked generator causes the horizontal phase also to shift by the same amount. However, since the genlocked generator has to be horizontally locked to the external sync generator, for each 360 degree rotation of system phase the horizontal phasing must be changed by one cycle of $F_{sc}$. This is because there is a boundary at which the horizontal phase reset circuits may pick the $F_{sc}$ cycle on one side of the boundary or the $F_{sc}$ cycle on the other side of the boundary almost one cycle of $F_{sc}$ later if the boundary is traversed.

Figure 2:
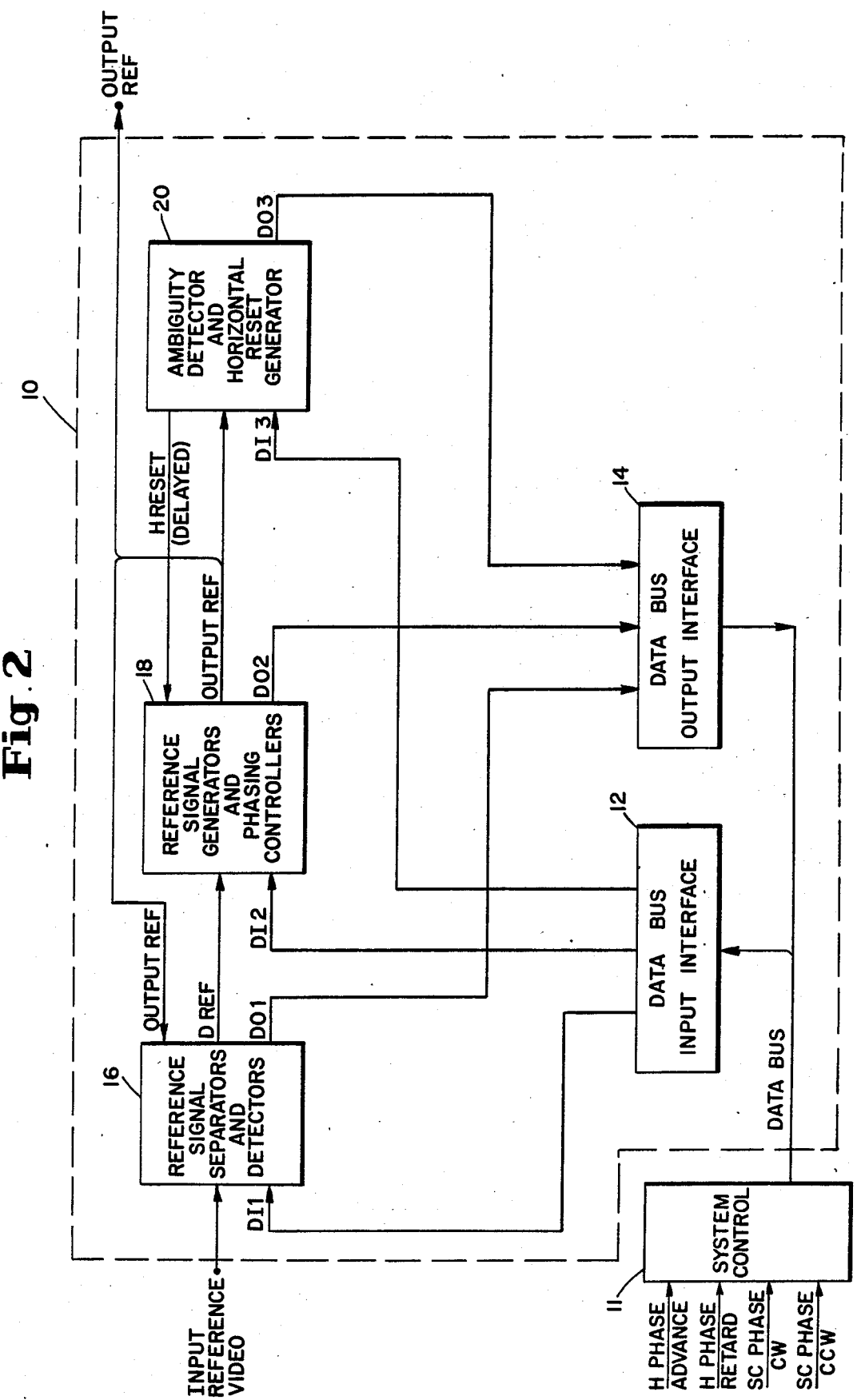
FIG. 2 is a functional block diagram of a sync generator portion of a television signal processor employing an ambiguity detector and horizontal reset generator according to the present invention.

To assist in an understanding of the invention, a genlocked sync generator using the technique of the invention is described briefly in the context of a microprocessor-controlled digital time base corrector for a typical video recording system and in the context of the signals available in such systems as illustrated in FIG. 2. Thereafter, only that aspect of the sync generator to which the present invention specifically is directed will be described in greater detail in connection with FIGS. 3–6.

Referring now to the sync generator functional block diagram of FIG. 2, sync generator 10 receives a video signal (INPUT REFERENCE VIDEO), including the sync and frequency references shown in FIGS. 1A–1C and provides a variety of reference signals described hereinafter in greater detail. External control data are conventionally provided to the sync generator 10 from the system controller 11 on a system data bus connected to a conventional input interface 12 such as a latch or register. Similarly, various output signals from the sync generator 10 are provided to the system controller 11 on the data bus via a conventional output interface 14.

The input reference video signal is supplied to conventional reference signal separator and detector circuits 16 which separate and detect the reference signals such as horizontal sync, vertical sync, and color burst in the video signal. In the case of a video recorder or other television equipment designed to handle different television standards, the input data DI1 from the data bus may include signals indicating the television standard being used, e.g. NTSC or PAL.

The detected reference signals DREF are supplied from the separator and detector circuits 16 to conventional reference signal generators and phasing controller circuits 18 to appropriately phase the output references. In addition, output data DO1 are conventionally provided from circuits 16 to the data bus via interface 14 to alert the system controller as to the presence or absence of the references, and for any like purpose.

The reference signal generators and phasing controllers 18 use the detected reference signals DREF and the input data DI2 from the data bus (e.g. television standards data and other control data) to generate the timing references required to appropriately make use of the video data. Among the references are the horizontal reference sync signal HR, the vertical sync signal VR, a 7.8 KHz reference, a 3.9 KHz reference for PAL systems, and the subcarrier signal $F_{sc}$, as well as multiples and fractions of those signals. The circuits 18 appropriately phase lock the various reference signals and provide output data DO2 (e.g. phasing information) to the data bus via the interface 14.

The reference signal generators and phasing controllers 18 provide the generated reference signals REF in a pulse format to an ambiguity detector and horizontal reset generator 20 described in detail hereinafter. The REF signals also are supplied to an output terminal for use by other circuits in the time base corrector, and some of the REF signals (e.g. the $F_{sc}$, $F_{sc}/4$ and $4F_{sc}$ signals) may also be supplied to the reference signal separator and detectors 16 as necessary. In addition, input data DI3 and output data DO3 may be exchanged with the system controller via the interfaces 12 and 14 as will be described in greater detail hereinafter.

As will be seen hereinafter, the circuit 20 generates a frame-rate horizontal reset pulse H RESET DELAYED referred to generally herein as the generated synchronizing signal. That H RESET DELAYED pulse is phase-locked to the regenerated subcarrier $F_{sc}$ which may have any fixed phase relationship with color burst, and is generated by a frame-rate pulse, of one horizontal line (H line) duration, clocked by $F_{sc}$ (e.g. the reset time is determined by the first positive-going $F_{sc}$ clock transition following the positive-going frame-rate pulse transition). As was mentioned, the system controller 11 is a conventional microprocessor-based unit that sends data to and receives data from the data bus input and output interfaces 12 and 14, respectively. The system controller also receives command signals from external controls (not shown) to change the phase of the regenerated subcarrier and to advance or retard the horizontal phase. The input command signals SC PHASE CW and SC PHASE CCW indicate changes in subcarrier phase in a clockwise (CW) or counterclockwise (CCW) direction, respectively, normally in one-quarter degree increments. The input command signals H PHASE ADVANCE and H PHASE RETARD indicate an advance or retardation of the regenerated horizontal sync relative to the reference video horizontal sync, normally in one $F_{sc}$ cycle increments. The SC PHASE and H PHASE information may be entered conventionally from an operator control panel or, alternatively automatically by a signal processor.

In view of the foregoing, it will be appreciated that the phase relationship of the regenerated subcarrier $F_{sc}$ and pulses derived therefrom can be varied with respect to the color subcarrier or reference burst. Likewise, the phase relationship between the regenerated subcarrier and the horizontal sync information can be varied. An ambiguity can occur under certain phase relationship conditions so the ambiguity detector and horizontal reset generator circuit 20 is provided to detect such ambiguity conditions and correct them without introducing unacceptable sync disturbances. Also, the circuit is arranged so that the desired phase relationship of the horizontal reset signal H RESET DELAYED is maintained when the processor is turned off and then on again.

It will be appreciated that the system controller is constantly apprised of the direction of phase shifts in the subcarrier $F_{sc}$ introduced through operator controls or external devices. Accordingly, system phase information may be provided from the system controller to the circuit 20 via interface 12. Likewise, information about detected ambiguity may be supplied from circuit 20 to the system controller via interface 14. On the basis of such information, phasing changes necessary to maintain the desired phase relationship and to eliminate any ambiguity may be made in the ambiguity detector and horizontal reset generator 20 as will be explained in connection with FIG. 3.

Figure 3:
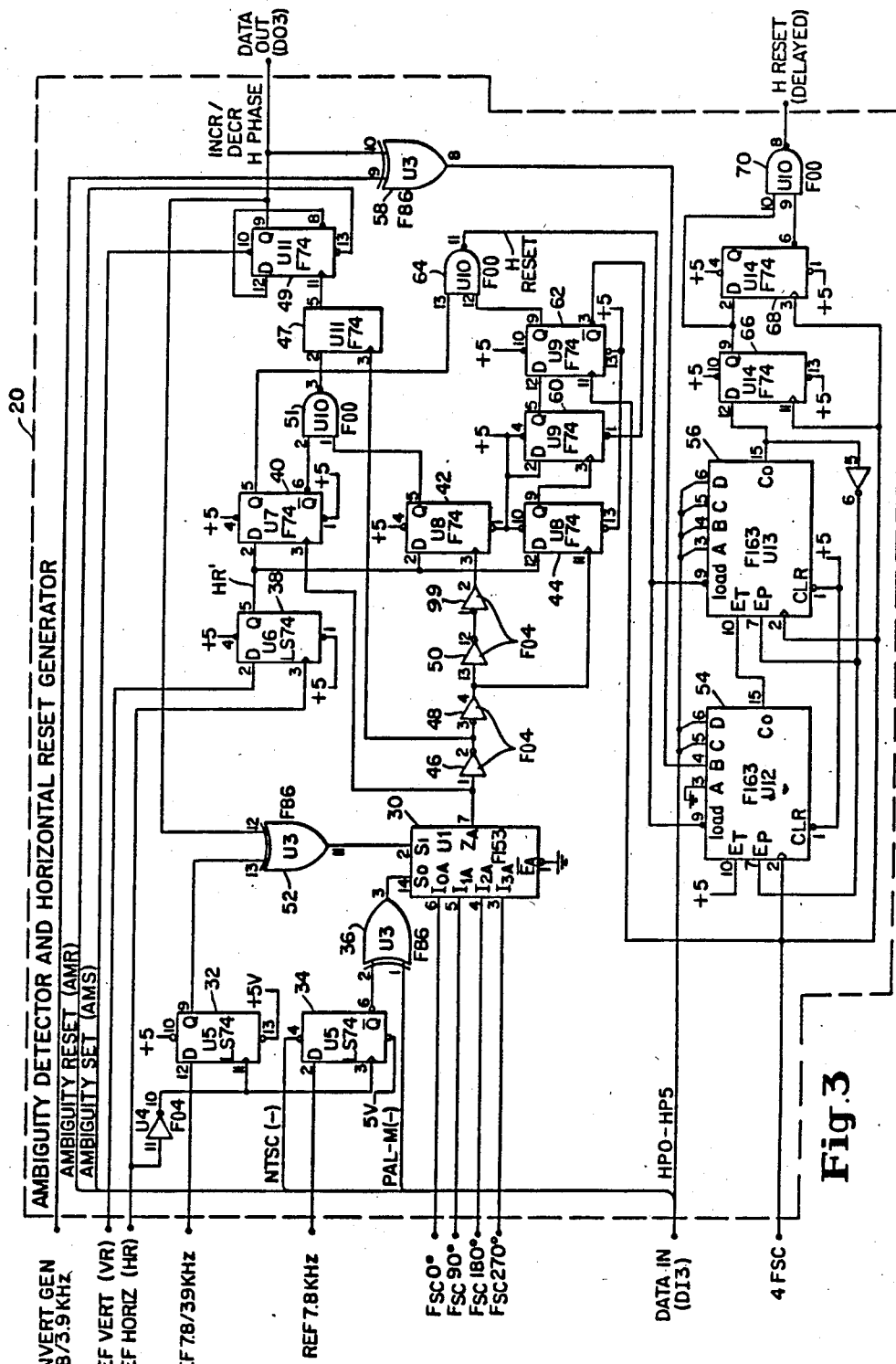
FIG. 3 is a schematic diagram of the ambiguity detector and horizontal reset generator of FIG. 2.

Referring now to FIG. 3 which schematically illustrates the ambiguity detector and horizontal reset generator 20 of FIG. 2 the system controller applies the horizontal phase data HP0-HP5, a six-bit word representing the horizontal phase in integral cycles of the subcarrier $F_{sc}$. The system controller also supplies an ambiguity reset control signal AMR, an ambiguity set control signal AMS, and television standard control signals NTSC and PAL-M. The ambiguity reset and set signals AMR and AMS are used at power on to set the ambiguity detector bistable 49 to the same condition as when the power was removed and ensure that the same phase of the horizontal reset pulse is maintained. The NTSC and PAL-M signals provide information as to which television standard is being used.

The reference signal generators and phasing controllers 18 of FIG. 2 supply the INVERT GEN 7.8/3.9 Kz, the VR, the HR, the REF 7.8/3.9 KHz, the REF 7.8, the $4F_{sc}$, and the four phases 0, 90, 180, and 270 of the $F_{sc}$ signal. As will be seen hereinafter, these reference signals are used to generate the horizontal reset signal H RESET and to detect any ambiguity condition that might adversely affect its phasing.

With continued reference to FIG. 3, all of the individual elements are conventional logic elements illustrated in accordance with normal logic conventions. The rectangular elements designated U5, U6, U7, U8, U9, U11 and U14 are D-type flip-flops or latches each with a data input terminal D, a clock input terminal denoted by a triangle or an arrowhead, a set input terminal at the top of the rectangle, a reset input terminal at the bottom of the rectangle, and "true" and "false" output terminals $\overline{Q}$ and Q respectively. The gate elements designated U3 are exclusive-OR gates, the gate elements designated U10 are NAND gates, and the triangular shaped elements are inverters. Element U1 is a commutating switch with one of the inputs $I_{0A}$-$I3_A$ being supplied to the output terminal ZA as selected by the input signals at terminals S0 and S1. Finally, elements U12 and U13 are 4-bit counters connected together in a conventional fashion to provide an eight-bit counter which can be preset to a desired count by the input bits at terminals A–D when loaded by a signal applied to the load input terminal.

The $F_{sc}$ signals are commutated by the commutating switch 30 in accordance with a reference related to the television standard in use to ensure that the $F_{sc}$ signal used to generate the H RESET signal is in a fixed phase relationship with the horizontal reference on every line. Accordingly, the selection of the output of the commutating switch 30 is determined by the reference 7.8 KHz and/or 3.9 KHz and the television standard in use. In NTSC only the reference 7.8 KHz via flip-flop 32 is used, whereas in PAL or PAL-M both the 7.8 KHz and 3.9 KHz signals are used via flip-flop 34 and 32, respectively. The exclusive-OR gate 36 inverts the 7.8 KHz signal in PAL-M to commutate the switch in the reverse direction from PAL since the PAL-M line has an extra $\frac{1}{4}$ cycle of $F_{sc}$ (or one cycle of $4F_{sc}$) whereas the PAL line has $-\frac{1}{4}$ cycle of $F_{sc}$. These figures can be derived by dividing the number of $4F_{sc}$ cycles per line by four, which gives the following:

|  | NTSC | PAL-M | PAL |
| --- | --- | --- | --- |
| No. of $4F_{sc}$ cycles/line | 910 | 909 | 1135 |
| No. of $F_{sc}$ cycles/line | 227.5 | 227.25 | 283.75 |

In the PAL system, the fixed phase relationship of $F_{sc}$ with the horizontal reference signal on every line cannot be achieved because of the 25 Hz offset. However, as will be seen, since the H RESET is generated at a 25 Hz frame rate, the 25 Hz offset can be ignored in generating H RESET.

Figure 4:
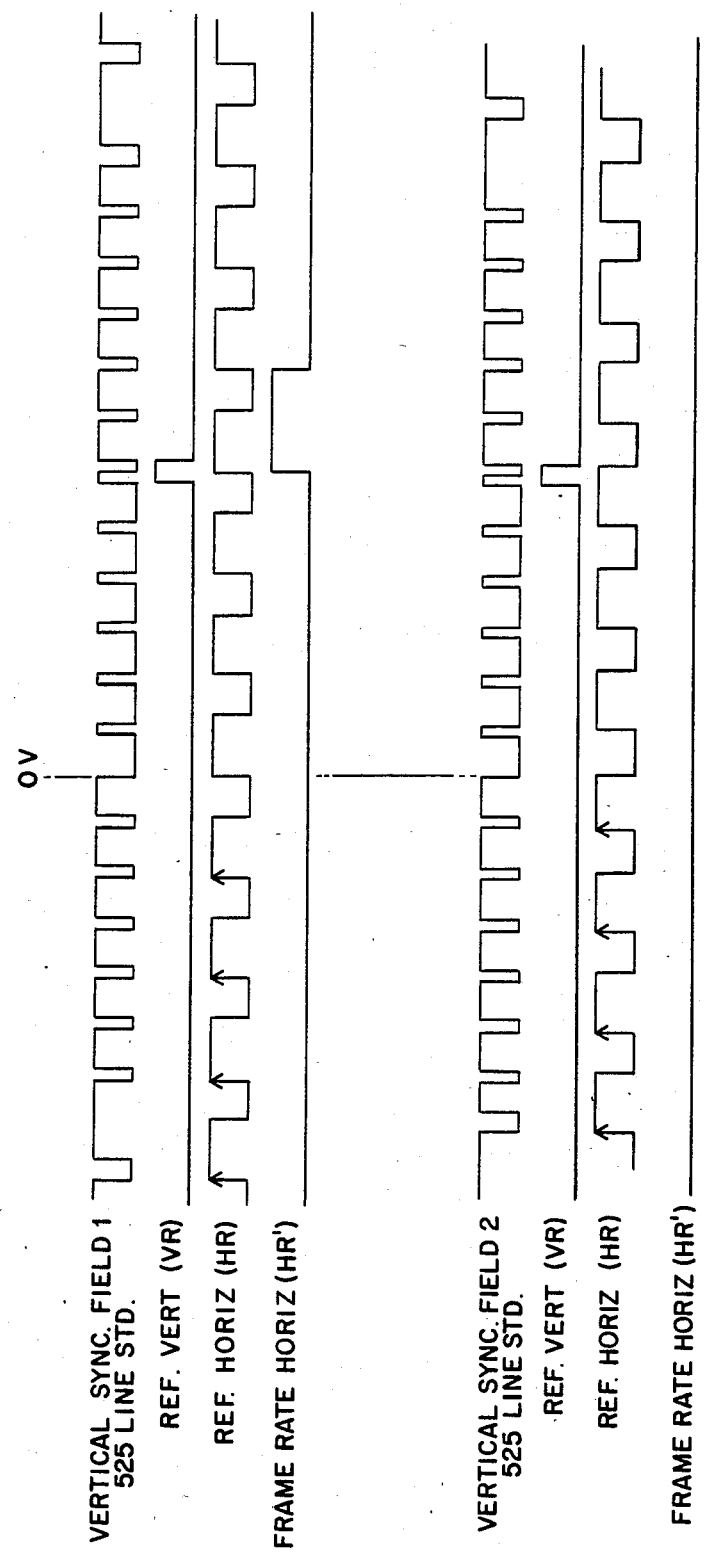
FIG. 4 is a graphic illustration of the waveforms for the generation of the frame-rate horizontal reference HR' from reference vertical VR and horizontal reference HR, which are separated from the reference video input to which the sync generator is genlocked.

A frame-rate horizontal reference pulse HR' of one line duration is established by the flip-flop 38 in response to the HR and VR signals. As is shown in FIG. 4, HR' occurs in field 1 of each frame for the 525 line standard. The frame-rate pulse HR' is supplied to the data input terminal of each of the flip-flops 40, 42 and 44, and the commutated $F_{sc}$ signal from commutating switch 30 is supplied to the clock input terminal of flip-flop 40 and to the flip-flops 42 and 44 after varying amounts of delay introduced by inverters 46, 48, 50, 99. If the positive $F_{sc}$ clock transition occurs close to the positive transition of the frame-rate pulse HR', the horizontal reset could be ambiguous because it might hop back and forth by one cycle of $F_{sc}$. Such a condition is shown in FIG. 5 wherein it can be seen that if the H RESET pulse is generated by occurrence of the positive-going edge of $F_{sc}$ during the positive portion of HR', a very slight phase change in HR' or $F_{sc}$, e.g. a shift from HR' (A) to HR' (B) shown in FIG. 5, may result in a one $F_{sc}$ cycle hop in the H RESET pulse and therefore the H RESET DELAYED pulse under the illustrated conditions.

Figure 5:
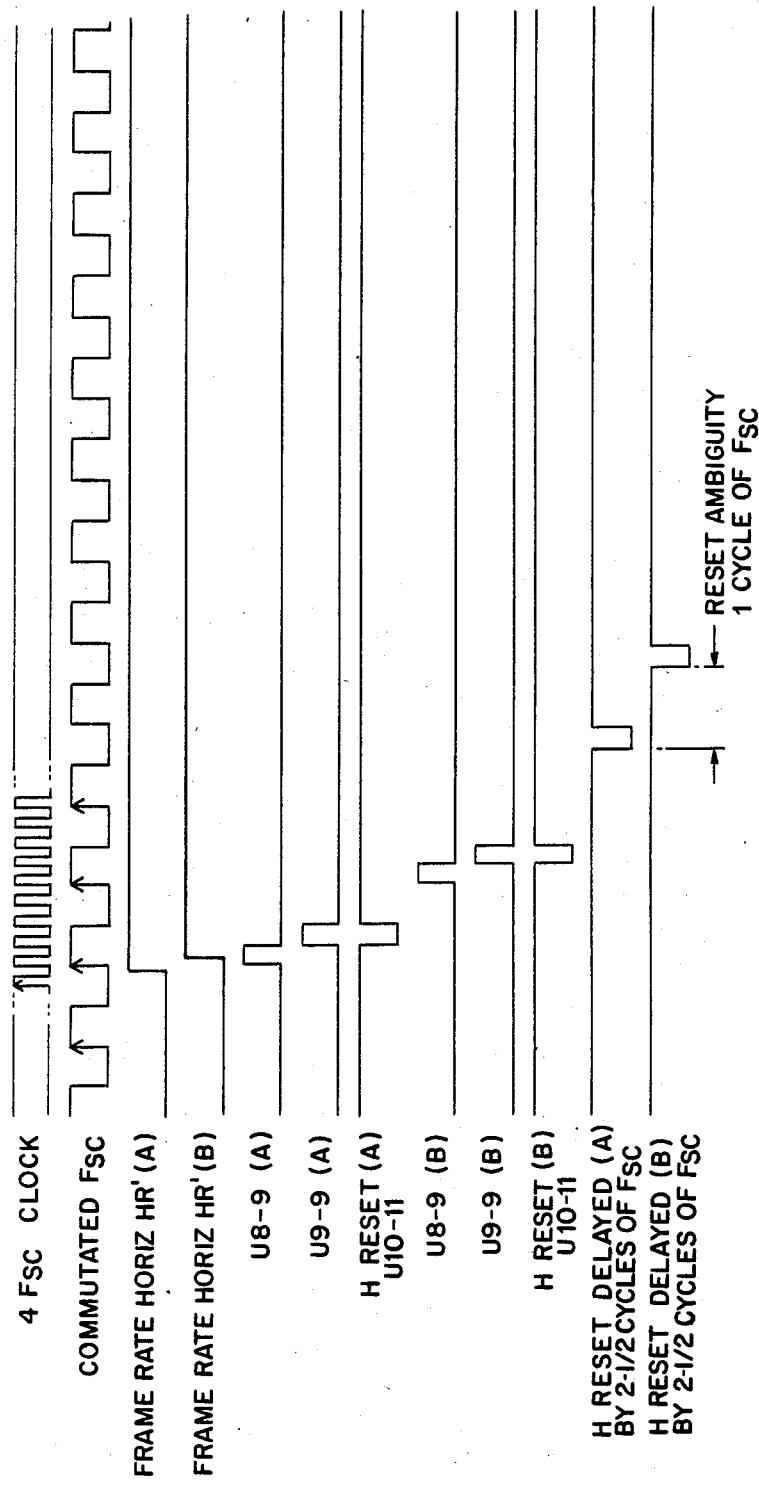
FIG. 5 is a graphic illustration of waveforms for the generation of the H RESET and H RESET DELAYED synchronization pulses in the circuit of FIG. 3 without any ambiguity detector showing that one cycle of $F_{sc}$ ambiguity can occur when the positive transition of the commutated $F_{sc}$ signal is close to the positive transition of the frame-rate horizontal reference HR'.

The circuit of FIG. 3 therefore detects a condition of possible coincidence ambiguity between relevant transitions of the two reference signals by detecting the occurrence of the transitions within a predetermined time period or "ambiguous region", e.g. a condition such as that shown in FIG. 5, and changes the phase of the commutated $F_{sc}$ signal by substantially 180 degrees so that the $F_{sc}$ clock transition is now 180 degrees away from the ambiguous region. As a result, the coincidence ambiguity will be eliminated but the H RESET signal will be shifted by one-half cycle of $F_{sc}$. Therefore, simultaneously, the H RESET DELAYED signal is shifted by one-half cycle of $F_{sc}$ to cause it to occur in its original position such that the changeover is essentially transparent as shown in FIG. 6A.

Figure 6B:
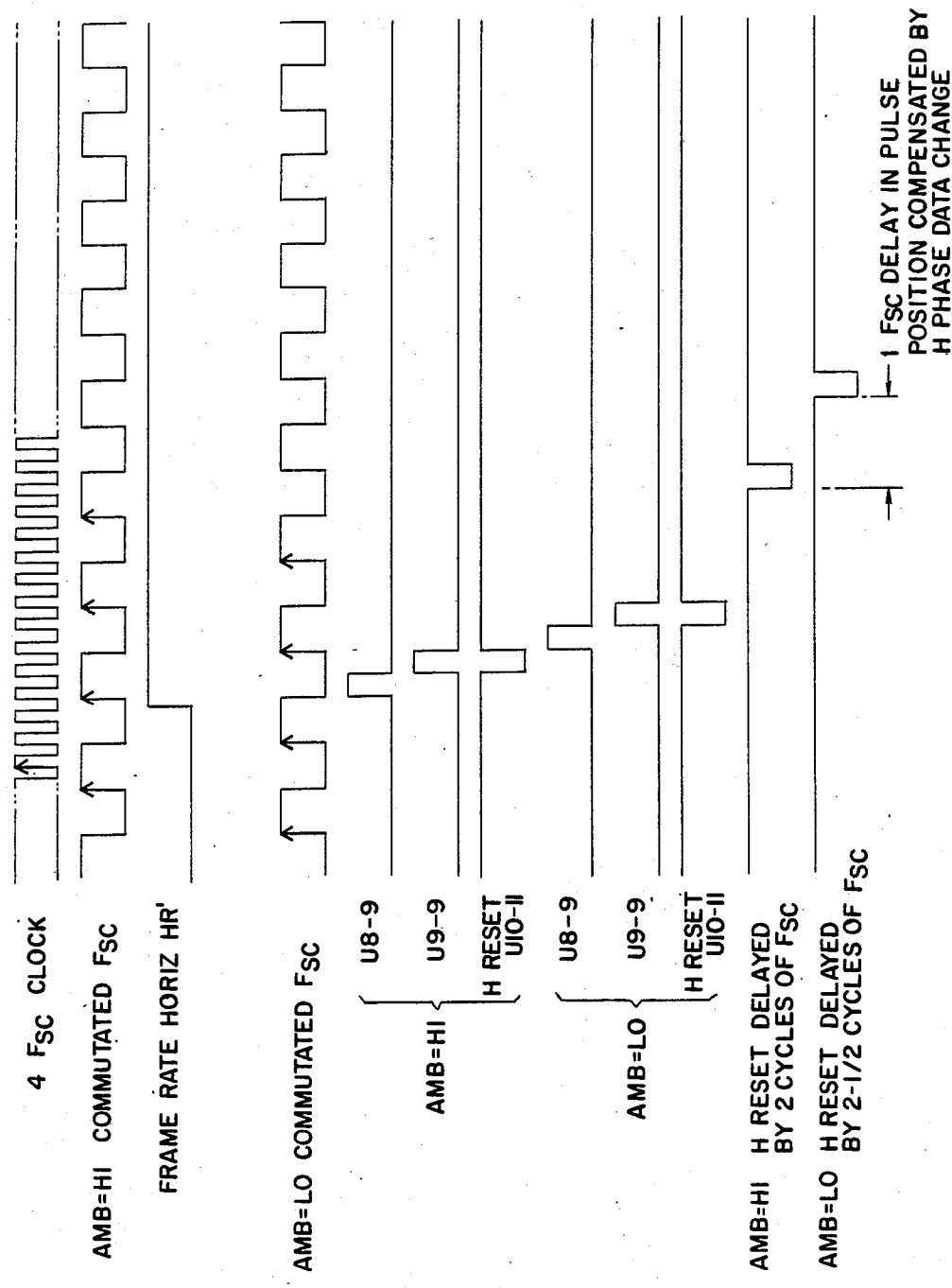
FIG. 6A is a graphic illustration of waveforms for the generation of the H RESET and H RESET DELAYED synchronizing pulses in the circuit of FIG. 3 with an ambiguity detector, showing that under one set of conditions the one cycle of $F_{sc}$ ambiguity in the H RESET DELAYED synchronizing pulse is eliminated by shifting the phase of the $F_{sc}$ clock one-half cycle of $F_{sc}$, thereby delaying the H RESET pulse one-half cycle of $F_{sc}$ and the delay is compensated by advancing the H RESET DELAYED pulse by one-half cycle of $F_{sc}$; and, FIG. 6B is a graphic illustration of waveforms for the generation of the H RESET and H RESET DELAYED synchronizing pulses in the circuit of FIG. 3 with an ambiguity detector, showing that under another set of conditions the one cycle of $F_{sc}$ ambiguity in the H RESET DELAYED synchronizing pulse is eliminated by shifting the phase of the $F_{sc}$ clock one-half cycle of $F_{sc}$, thereby delaying the H RESET pulse one-half cycle of $F_{sc}$ and causing a one $F_{sc}$ cycle shift in the H RESET DELAYED pulse, such that the one cycle delay must be compensated by shifting the H RESET DELAYED pulse by one full cycle of $F_{sc}$.

The detector of the ambiguous region is implemented in the circuit of FIG. 3 by the flip-flops or latches 40, 42, 47, and 49, and the NAND gate 51. If the frame-rate reset pulse HR' is ambiguous relative to the $F_{sc}$ clock, the latch 40 output terminal $\overline{Q}$, which is normally high, will remain clocked high on one $F_{sc}$ clock edge, and the latch 42 output terminal Q will be clocked high on the same delayed $F_{sc}$ clock edge. Latch 40 output terminal $\overline{Q}$ will be clocked low on the next $F_{sc}$ clock edge. Since the Q output signal from latch 42 goes high almost one $F_{sc}$ cycle earlier than the $\overline{Q}$ signal from latch 40 goes low, the output signal from NAND gate 51 is a negative going pulse of approximately one $F_{sc}$ cycle duration. One-half cycle of $F_{sc}$ later, latch 47 is clocked and its Q output terminal goes low. However, latch 47 output terminal Q is clocked high on the next $F_{sc}$ cycle. This positive going transition then clocks latch 49 which is connected in a bistable configuration. When the Q output signal from latch 49 changes state, the 7.8/3.9 KHz signal to the commutating switch 30 is inverted from its previous state by exclusive-OR gate 52, shifting the commutated $F_{sc}$ signal substantially by 180 degrees and making the generation of the H RESET signal non-ambiguous as shown in FIGS. 6A and 6B.

As was previously mentioned, the phase shift of the $F_{sc}$ clock makes the H RESET pulse non-ambiguous but it causes the H RESET pulse to be phase-shifted and generated at the wrong time. This phase shift of the H RESET pulse is compensated by changing the horizontal phasing information to counter 54/56 to advance or retard the phase of the H RESET DELAYED pulse by one-half cycle of $F_{sc}$. To accomplish that one-half cycle phase shift in accordance with the preferred embodiment of the present invention, the output signal from the Q output terminal of bistable circuit 49 is supplied via exclusive-OR gate 58 to the one-half $F_{sc}$ cycle phase shift input terminal B of the counter 54. This results in an increase or decrease in phase shift of the H RESET DELAYED pulse by one-half $F_{sc}$ cycle because of the change in the preset count of the counter 54/56 and thus the change in delay of the counter from the time it is preset or loaded by the H RESET pulse and the time it produces an output signal at terminal C0 of counter 56.

Since the ambiguity circuit either adds or subtracts one-half $F_{sc}$ cycle from the horizontal phase (i.e. the H RESET DELAYED pulse), the result is that for each 360 degrees of rotation of $F_{sc}$ phase there are two positions of ambiguity. One of these positions of ambiguity is handled as described above and is transparent to the operator (see FIG. 6A). However, the other position will result in a one $F_{sc}$ cycle picture shift (see FIG. 6B).

To eliminate the foregoing problem and make all ambiguity corrections transparent, the direction of phase change of commutated $F_{sc}$ is sent to the system controller by applying the INCR/DEC H PHASE signal from the latch 49 to the system controller via the data bus. Thus, the system controller knows the direction of each phase shift in commutated $F_{sc}$ introduced to eliminate an ambiguity. The system controller also is provided with information indicating the direction of the $F_{sc}$ phase shift being introduced by the operator. Accordingly, the horizontal phase control data HP0–HP5 from the controller can be modified to change the delay of counter 54/56 by one $F_{sc}$ cycle. This results in making all ambiguity corrections transparent to the operator and provides the ability to shift the system phase through many cycles of $F_{sc}$ while having the horizontal sync follow continuously without picture disturbance.

As was previously noted, the system controller 11 ensures the proper timing of the H RESET DELAYED pulse by providing one of the following: it maintains the horizontal phase control data in its original state; or it modifies the phase control data to add one cycle of $F_{sc}$ delay; or it modifies the phase control data to subtract one cycle of $F_{sc}$ delay; depending on the direction of change of the ambiguity detector output and the direction of subcarrier phase rotation. The system controller 11 monitors the ambiguity output and the direction of subcarrier rotation and modifies the horizontal phase control data as follows:

| SC PHASE ROTATION | AMBIGUITY DETECTOR | H PHASE DATA |
| --- | --- | --- |
| CW | HIGH TO LOW | −1 CYCLE |
| CW | LOW TO HIGH | NO CHANGE |
| CCW | LOW TO HIGH | +1 CYCLE |
| CCW | HIGH TO LOW | NO CHANGE |

With continued reference to FIG. 3, it will be appreciated that if there is no possible coincidence ambiguity, i.e., H RESET pulse is non-ambiguous, as it normally would be, the signal at the Q output terminal of latch 40 will change its state several nanoseconds earlier than the signal from the Q output terminal of latch 42, since latch 40 is clocked earlier. The output signal from the NAND gate 51 therefore is a narrow negative pulse fed to the D input terminal of the latch 47 at the trailing edge of the frame-rate pulse HR′ of one line length. Since latch 47 is clocked by the inverted and delayed signal from inverter 46, approximately one half $F_{sc}$ cycle later, the negative pulse at the D input terminal of latch 47 is gone and latch 47 remains set with its Q output signal at a high level. Therefore, latch 49 remains in its present state and no H phase change is commanded.

Finally, it will be appreciated that the horizontal reset pulse H RESET is generated by the delayed, commutated $F_{sc}$ signal which clocks the frame-rate horizontal sync reference pulse HR′ into latch 44. Latches 60 and 62 are connected to function as a pulse generator clocked by the output signal from the Q output terminal of latch 44. When the output from latch 44 goes high, it clocks pulse generator 60/62 and produces a frame-rate pulse one cycle of 4 $F_{sc}$ wide at the Q output terminal of latch 62. If the horizontal reset is non-ambiguous, the output from the Q output terminal of latch 40 will go high before the pulse generator 60/62 is clocked. Therefore, the output signal from the NAND gate 64 will be the non-ambiguous horizontal reset pulse H RESET which is used to load horizontal phase data into phasing counter 54/56 to generate the H RESET DELAYED pulse with appropriate phasing.

As was previously mentioned, the phasing counter 54/56 provides a means by which the horizontal reset pulse can be delayed in integral cycles of $F_{sc}$ by the signals HP0–HP5 and in half-cycles of $F_{sc}$ by the signal from exclusive-OR gate 58. The output signal from the CO output terminal of counter 56 goes high when the count, incremented from the preset number, reaches a predetermined total. This inhibits further counting and simultaneously causes the generation of a negative going pulse, one cycle of $4F_{sc}$ wide, via the latches 66 and 68 and NAND gate 70.

The principles, preferred embodiment and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A system for generating a synchronizing signal in response to two timing reference signals each related to a different one of a plurality of timing references in a data signal wherein one of the two timing reference signals can be shifted in phase relative to the other of the two timing signals, the system comprising:
   means for generating a synchronizing signal in response to coincidence between predetermined parts of the two timing reference signals;
   means for detecting a condition of possible coincidence ambiguity between the two timing reference signals which can cause a significant phase change in the generated synchronizing signals;
   means responsive to said ambiguity detecting means for shifting the phase of one of the reference signals by substantially 180 degreees to eliminate the coincidence ambiguity between the two signals; and
   means for shifting the phase of the generated synchronizing signal one-half cycle of the one of the reference signals in a direction to compensate for the phase shift of the one of the reference signals.

2. The system of claim 1 wherein said two timing reference signals are digital signals related to a television sync signal and a television subcarrier frequency reference and wherein said generating means includes means for generating a synchronizing pulse in response to coincidence between a level transition of the subcarrier frequency-related timing reference signal and a predetermined digital level of the sync-related timing reference signal.

3. The system of claim 2 wherein said means for shifting the phase of one of the reference signals by substantially 180 degrees includes means for inverting the subcarrier frequency-related timing reference signal when said level transition of the subcarrier frequency-related timing reference signal and a transition in said sync related timing reference signal from said predetermined digital level to another level occur within a predetermined time period.

4. The system of claim 3 wherein said means for shifting the phase of the generated synchronizing signal includes means for modifying the phase of said generated synchronizing signal by at least one-half cycle of the subcarrier frequency-related timing reference signal in response to the 180 degree phase shift of the subcarrier frequency-related timing reference signal.

5. The system of claim 4 wherein said means for modifying the phase of the generated synchronizing signal comprises a counter presettable to a starting count by an applied data signal, and ambiguity detecting means for detecting said condition of possible coincidence ambiguity and for changing the applied data signal to the presettable counter in response to the detection of an ambiguity.

6. The system of claim 1 wherein said system is part of a color television signal processor and wherein said two timing reference signals are color television horizontal line reference pulses and subcarrier frequency reference pulses.

7. The system of claim 1 including means for monitoring the direction of any change in phase of the one of the reference signals, said means for shifting the phase of the generated synchronizing signal being responsive to said monitoring means to shift the phase of the generated synchronizing signal in a direction to compensate for the phase shift of the one of the reference signals such that the phase shift of the generated synchronizing signal is transparent to the system.

8. The system of claim 1 wherein said system is part of a color television signal processor and wherein said two timing reference signals are digital signals related to horizontal sync and subcarrier frequency reference signals in a color television signal.

9. The system of claim 8 wherein said generated synchronizing signal is a horizontal reset pulse and said generating means locks the generated horizontal reset pulse to the subcarrier frequency reference.

10. The system of claim 8 including means for adjusting the phase of the subcarrier frequency reference.

11. The system of claim 10 wherein said means for shifting the phase of the generated synchronizing signal comprises means for phase-shifting the horizontal reset pulse by one-half cycle of the subcarrier frequency reference in a direction to compensate for any phase shift of the subcarrier frequency reference.

12. A synchronization signal generator for maintaining composite system phase control in a genlocked color television signal processing system comprising:
means for generating clock pulses in response to a color burst reference in the television signal, said clock pulses being variable in phase relative to said color burst reference;
means for generating frame-rate horizontal reference pulses in response to a horizontal sync reference and a vertical sync reference in the television signal;
means for generating a frame-rate horizontal reset pulse in response to a predetermined coincidence relationship between one of said clock pulses and one of said frame-rate horizontal reference pulses;
means for detecting a predetermined condition of ambiguity in said coincidence relationship;
means responsive to said ambiguity detecting means for modifying the phase of the clock pulses to eliminate said condition of coincidence ambiguity; and
means responsive to said ambiguity detecting means for modifying the phase of the generated horizontal reset pulse to maintain its timing to that which it had before the phase of the subcarrier reference pulses was modified.

13. The system of claim 12 wherein said means for modifying the phase of the generated horizontal reset pulse comprises a digital counter presettable by a data signal including information from said ambiguity detecting means.

14. In a signal processing system, apparatus for maintaining the relative timing of a recurring synchronizing signal generated in response to coincidence between a transition of a clock signal derived from one reference signal in a composite data signal and a predetermined digital level of a timing pulse derived from another reference signal in the composite data signal wherein the phase of the clock signal is adjustable in phase relative to the one reference signal, the apparatus comprising:
means for detecting a condition of possible coincidence ambiguity wherein the transition of the clock signal and a transition in the level of the timing pulse occur within a predetermined time period;
means for inverting the clock signal in response to the detection of the condition of possible coincidence ambiguity; and,
means for modifying the phase of the data synchronizing signal by one-half cycle of the clock signal in a direction such that the data synchronizing signal occurs at the same time relative to said one reference signal in the composite data signal both before and after the clock signal is inverted.

15. The apparatus of claim 14 wherein said phase modifying means comprises a presettable counter, and means for presetting said counter to a count determined at least in part by said ambiguity detecting means.

16. The apparatus of claim 15 wherein said counter is preset as a function of the direction of adjustment of the phase of the clock signal.

17. A method for generating a synchronizing signal in response to two timing reference signals each related to a different one of a plurality of timing references in a data signal wherein one of the two timing reference signals can be shifted in phase relative to the other of the two timing signals, the method comprising the steps of:
generating a synchronizing signal in response to coincidence between predetermined parts of the two timing reference signals;
detecting a condition of possible coincidence ambiguity between the two timing reference signals which can cause significant phase change in the generated synchronizing signals;
shifting the phase of one of the reference signals by substantially 180 degrees in response to said condition of possible coincidence ambiguity between the two timing signals to thereby eliminate the possibility of coincidence ambiguity; and
shifting the phase of the generated synchronizing signal at least one-half cycle of the one of the reference signals in a direction to compensate for the phase shift of the one of the reference signals.

18. The method of claim 17 wherein said data signal is a color television signal and wherein said two timing reference signals are digital signals related to horizontal sync and subcarrier frequency reference signals in a color television signal.

19. The method of claim 18 wherein said generated synchronizing signal is a horizontal reset pulse phase-locked to the subcarrier frequency reference signal.

20. The method of claim 19 wherein the phase of the generated horizontal reset pulse is shifted by one-half cycle of the subcarrier frequency reference in a direction to compensate for the 180 degree phase shift in the subcarrier reference signal in response to a condition of possible coincidence ambiguity such that there is no apparent change in the position of the horizontal reset pulse.

21. The method of claim 17 wherein the phase of the generated synchronizing signal is shifted by:
applying the generated synchronizing signal to a presettable counter; and, presetting the counter with a data signal having a value related to the current ambiguity condition of the two reference signals and the direction of phase change of the one of the reference signals.

22. The method of claim 21 including the steps of storing the current ambiguity condition of the two reference signals, and restoring the ambiguity condition to the stored condition upon initial system turn-on.

* * * * *